United States Patent
Han et al.

(10) Patent No.: US 8,745,399 B2
(45) Date of Patent: Jun. 3, 2014

(54) METHOD FOR SHARING AND UPDATING KEY USING WATERMARK

(75) Inventors: Jin Hee Han, Daejeon (KR); Young Sae Kim, Daejeon (KR); Geon Woo Kim, Daejeon (KR); Hong Il Ju, Daejeon (KR); Su Gil Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 668 days.

(21) Appl. No.: 12/786,771

(22) Filed: May 25, 2010

(65) Prior Publication Data

US 2011/0145582 A1 Jun. 16, 2011

(30) Foreign Application Priority Data

Dec. 11, 2009 (KR) ........................ 10-2009-0123463

(51) Int. Cl.
*H04L 29/06* (2006.01)

(52) U.S. Cl.
USPC ............... 713/176; 380/44; 380/262; 726/32; 726/33

(58) Field of Classification Search
USPC ................................... 713/169, 171, 176, 182
See application file for complete search history.

(56) References Cited

U.S. PATENT DOCUMENTS

| | | | |
|---|---|---|---|
| 2003/0070075 A1* | 4/2003 | Deguillaume et al. | 713/176 |
| 2006/0045309 A1 | 3/2006 | Suthaharan | |
| 2009/0132825 A1 | 5/2009 | Mohanty | |
| 2009/0276635 A1* | 11/2009 | Baggen et al. | 713/182 |

FOREIGN PATENT DOCUMENTS

| | | |
|---|---|---|
| KR | 1020050078767 A | 8/2005 |
| KR | 10-2007-0042511 A | 4/2007 |
| KR | 1020080002244 A | 1/2008 |
| KR | 1020080022255 A | 3/2008 |
| KR | 100902490 B1 | 4/2009 |

* cited by examiner

*Primary Examiner* — Justin T Darrow

(57) ABSTRACT

A method for sharing and updating a key using a watermark is disclosed. The method includes receiving an image to be encoded from an image input device encoding the image, and inserting a master key value as a watermark into the encoded image, for use as an input of a key derivation function.

20 Claims, 4 Drawing Sheets

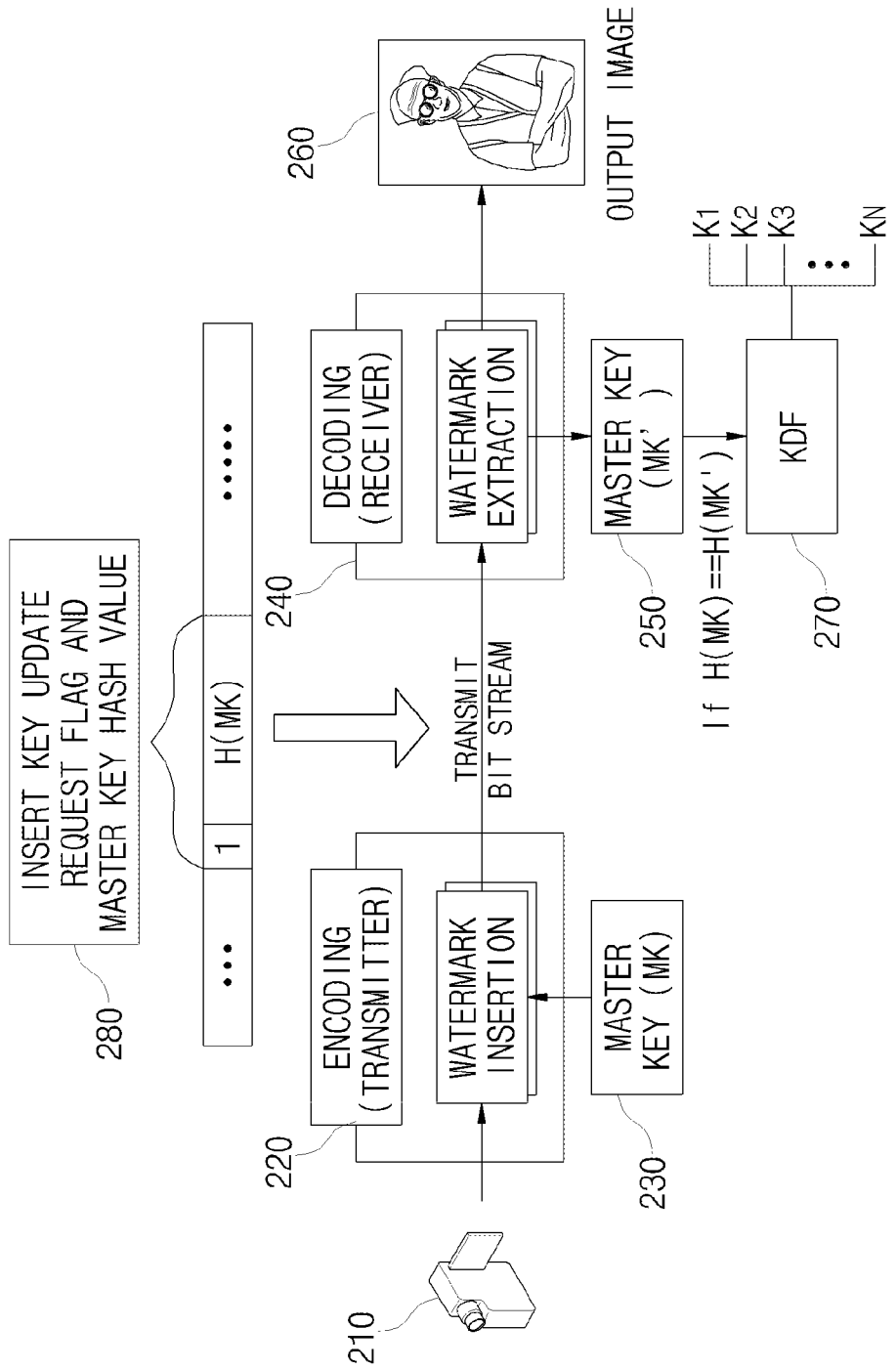

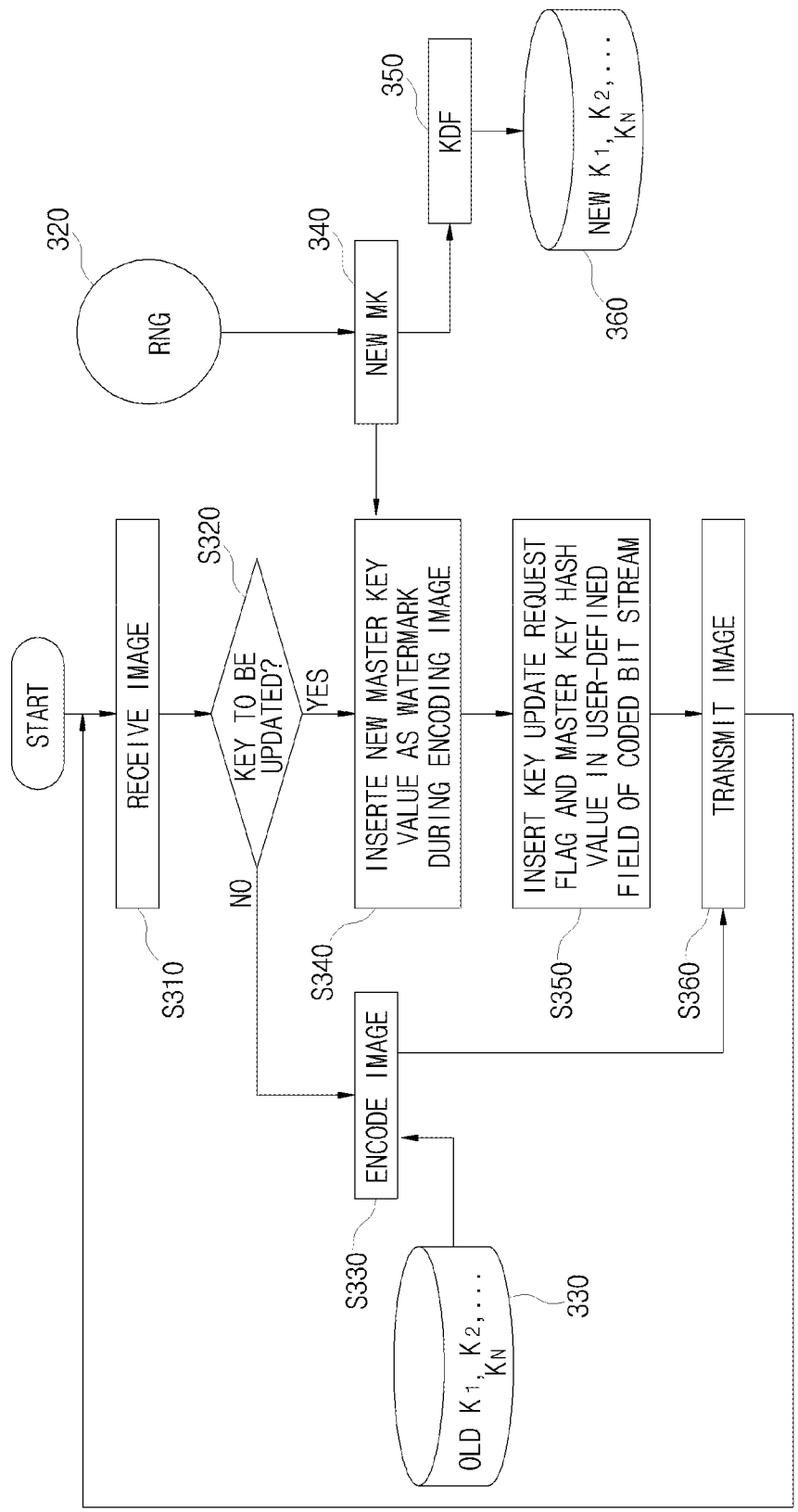

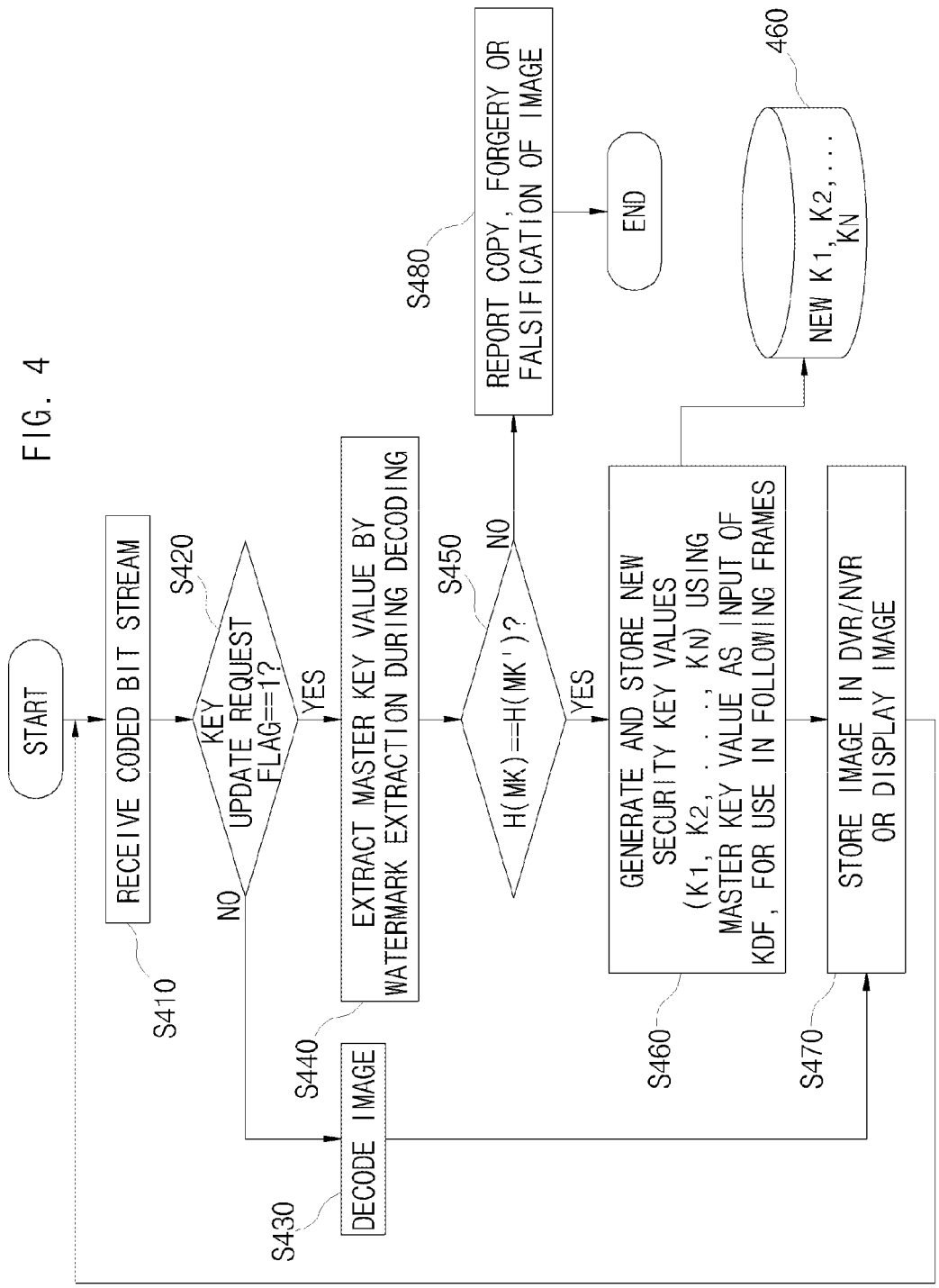

METHOD FOR SHARING AND UPDATING KEY USING WATERMARK

CROSS-REFERENCE TO RELATED APPLICATIONS

This application claims priority under 35 U.S.C. §119 to Korean Patent Application No. 10-2009-0123463, filed on Dec. 11, 2009, in the Korean Intellectual Property Office, the disclosure of which is incorporated herein by reference in its entirety.

BACKGROUND OF THE INVENTION

1. Field of the Invention

The present invention relates to a method for sharing and updating a key, and more particularly, to a method for sharing and updating a key safely and efficiently, using a watermark inserted into an image to prevent illegal copy, forgery and falsification of the image.

2. Description of the Related Art

Network communication is vulnerable to intruders' attacks. Therefore, encryption is used for secure communication and thus a key sharing and update mechanism is required for the encryption.

In general, to provide a key sharing and update function between a terminal and a server or between terminals, a key management module should be separately operated. In addition, when a key is shared and updated, a secure channel should be established mutually and a key value should be transmitted via the secure channel. In other words, many elements are additionally needed to implement a key sharing and update mechanism.

A watermark may be inserted into an image to prevent illegal copy, forgery and falsification of the image. Intellectual property right information, content information, a user Identifier (ID), etc. are available as watermarks.

FIG. 1 illustrates a conventional operation for inserting a watermark into an image and extracting the watermark from the image.

Referring to FIG. 1, upon receipt of an image through a camera 110, a transmitter 120 inserts a watermark value 130, W into an image during encoding the image. The watermark value 130, W is inserted into a predetermined parameter during the encoding, or into a predetermined parameter extracted from the image after the encoding. The latter method is usually used when an image is encoded or a watermark is inserted into an image, without modifying a Coder and Decoder (CODEC).

The coded image is transmitted as a bit stream to a receiver 140. The receiver 140 extracts a watermark value 150, W' from the image during decoding the image and compares the watermark value W with the watermark value W'. If the watermark values W and W' are equal, the receiver 140 outputs an image 160 and otherwise, the receiver 140 notifies a manager or a user that the image was forged or falsified.

SUMMARY OF THE INVENTION

Therefore, the present invention has been made in view of the above problems, and it is an object of the present invention to provide a novel method for sharing and updating a key using a watermark that is used to prevent illegal copy, forgery, and falsification of an image.

It is another object of the present invention to provide a method for sharing and updating a key safely and efficiently.

To achieve the above and other objects, the present invention provides a method for sharing and updating a key, including receiving an image to be encoded from an image input device, encoding the image, and inserting a master key value as a watermark into the encoded image, for use as an input of a key derivation function.

The method may further include inserting key-related information in a user-defined field of a bit stream of the coded image with the watermark inserted, and the key-related information may include a key update request flag and a master key hash value.

The method may further include decoding the bit stream, extracting the master key value inserted as a watermark from the decoded bit stream, and extracting the master key hash value from the user-defined field. The method may further include calculating a hash value of the extracted master key value, comparing the calculated master key hash value with the master key hash value extracted from the user-defined field, and notifying that, the image is forged or falsified, if the calculated master key hash value is different from the extracted master key hash value. The method may further include checking the key update request flag, calculating a hash value of the extracted master key value, comparing the calculated master key hash value with the master key hash value extracted from the user-defined field, and generating a new key value using the master key value by inputting the master key value to the key driving function, if the key update request flag is set to "1" and the calculated master key hash value is equal to the extracted master key hash value.

The master key value may be generated from a random number generator or using predetermined data including vital information or authentication information.

In accordance with the present invention, the above and other objects can be accomplished by the provision of a method for sharing and updating a key, including decoding a bit stream having a master key value inserted as a watermark, extracting the master key value, and generating a new key value using the master key value as an input of a key derivation function.

The bit stream may include a key update request flag in a user-defined field and the new key value may be generated using the master key value as the input of the key derivation function, if the key update request flag is set to "1". Or the bit stream may include a master key hash value in the user-defined field and the new key value may be generated using the master key value as the input of the key derivation function, if a calculated hash value of the extracted master key value is equal to the master key hash value included in the user-defined field.

BRIEF DESCRIPTION OF THE DRAWINGS

The above and other objects, features and other advantages of the present invention will be more clearly understood from the following detailed description taken in conjunction with the accompanying drawings, in which:

FIG. 2 illustrates a method for sharing and updating a key using a watermark according to an exemplary embodiment of the present invention;

FIG. 3 is a flowchart illustrating an operation of a transmitter in the method for sharing and updating a key according to an exemplary embodiment of the present invention; and FIG. 4 is a flowchart illustrating an operation of a receiver in the method for sharing and updating a key according to an exemplary embodiment of the present invention.

DETAILED DESCRIPTION OF THE INVENTION

Figure 1:
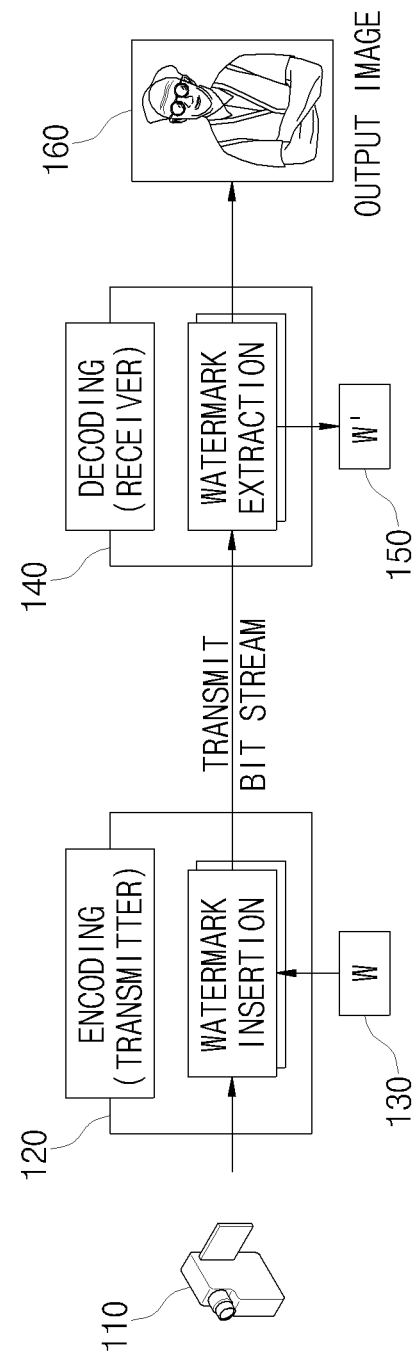
FIG. 1 illustrates a conventional watermark insertion method.

The advantages and features of the present invention and methods for achieving the advantages and features will be more clearly understood from the following detailed description taken in conjunction with the accompanying drawings. However, the invention is not limited to the embodiments set forth below and can be implemented in various ways. The embodiments of the present invention are provided to complete the disclosure of the invention and assist in a comprehensive understanding of the scope of the invention. It is also intended to be understood that the terminology employed herein is used for the purpose of describing particular embodiments only and is not intended to be limiting since the scope of the present invention will be limited only by the appended claims and equivalents thereof. It must be noted that, as used in this specification and the appended claims, the singular forms "a," "an," and "the" include plural referents unless the context clearly dictates otherwise. Also, the terms "comprise" and/or "comprising" should be understood to indicate the presence of a component, step, operation and/or device, not excluding the presence or probability of the presence of one or more other components, steps, operations, and/or devices.

With the attached drawings, exemplary embodiments of the present invention will be described below.

FIG. 2 illustrates a method for sharing and updating a key using a watermark according to an exemplary embodiment of the present invention.

Referring to FIG. 2, upon receipt of an image through a camera 210, a transmitter 220 inserts a watermark into an image during encoding the image. In accordance with the exemplary embodiment of the present invention, a master key value 230, MK is used as the watermark and inserted into a predetermined parameter of the image.

The master key value 230 may be generated from a Random Number Generator (RNG) or using predetermined data (e.g. vital information, authentication information, etc.).

If old key values are to be updated with the master key value 230, a key update request flag and a master key hash value H(MK) are inserted into a bit stream resulting from the encoding, as indicated by reference numeral 280, so that the integrity of the master key value may be verified for updating by extracting the watermark during decoding.

For this purpose, the key update request flag is set to "1" and then the master key hash value H(MK) is stored, in a user-defined field defined in a bit stream structure, as illustrated in FIG. 2. For example, in case of an H.264 image, the key update request flag and the master key hash value H(MK) are inserted into a Supplemental Enhancement Information (SEI) field.

To decode the image received from the transmitter 220, a receiver 240 should determine whether the additional information field exists in the bit stream of the coded image before the decoding. In the presence of the additional information field, the receiver 240 checks whether the key update request flag is "1" and if the key update request flag is "1", stores the master key hash value (the hash value of the master key value, MK) as an arbitrary variable.

The receiver 240 then extracts a watermark value 250, MK' during decoding the image, calculates a hash value of the watermark value 250, MK', and compares the stored master key hash value with the hash value of the watermark value 250, MK'. If the two values are different, the receiver 240 notifies a manager or a user that the image was forged or falsified during transmission and discontinues the decoding.

On the other hand, if the two hash values are equal, the receiver 240 outputs the image normally or stores the image in a Digital Video Recorder (DVR) or a Network Video recorder (NVR). The receiver 240 then generates and stores new key values $K_1, K_2, \ldots K_N$ by providing the master key value MK being the extracted watermark as an input to a Key Derivation Function (KDF) 270. The new key values are used for image encryption or watermarking of subsequent frames.

FIGS. 3 and 4 are flowcharts illustrating operations of the transmitter 220 illustrated in FIG. 2 for encoding and transmitting an image and the receiver 240 illustrated in FIG. 2 for receiving and decoding a coded image.

Both the transmitter 220 and the receiver 240 perform the same operation of generating new key values using a master key value acquired from an extracted watermark by a KDF and storing the new key values. The new key values are available to subsequent frames.

Referring to FIG. 3, upon receipt of an image in step S310, the transmitter determines whether to update a key in step S320. If determining not to update a key, the transmitter encodes the image using an old key value 330 in step S330.

On the other hand, if determining to update a key, the transmitter inserts a new master key value 340 as a watermark during encoding the image in step S340.

The new master key value 340 may be generated by an RNG 320 and new key values 360 are generated using the new master key value 340 as an input of a KDF 350. Once new keys are generated, the new keys are available to images input after a current frame.

Then the transmitter sets a key update request flag to "1" in a user-defined field of the encoded bit stream and inserts the hash value of the master key value in step S350. The transmitter then transmits the coded image to the receiver in step S360.

Now a description will be made of an operation for receiving and decoding an image in the receiver with reference to FIG. 4.

Referring to FIG. 4, upon receipt of a coded bit stream of an image from the transmitter in step S410, the receiver checks a key update request flag in a user-defined field of the coded bit stream in step S420. If the key update request field is set to "0", which implies there is no need for key updating, the receiver decodes the image using an old key in step S430.

On the other hand, if the key update request field is set to '1", the receiver acquires a master key value MK' by extracting a watermark during decoding the image in step S440.

The receiver compares a hash value H(MK') of the master key value MK' with a hash value H(MK) of a master key MK that the transmitter inserted during encoding in step S450. If the two hash values are equal, which means that the image was neither forged nor falsified, the receiver decodes the image. In step S460, the receiver generates new security key values 460 for use in frames following a current frame using the acquired master key as an input of a KDF and stores the new security key values 460. Then the receiver stores the decoded image in a video storage device such as a DVR or NVR, or displays the decoded image on a display in step S470.

On the contrary, if the two hash values are different in step S450, the receiver reports that the image was forged or falsified in step S480 and ends the procedure.

As is apparent from the above description, since a master key value to be shared between a network camera and a security policy server or between network cameras is defined as a watermark used to prevent illegal copy, forgery and falsification of an image, a key sharing and update function can be safely and efficiently provided between the network camera and the security policy server and between the network cameras as well as images with the watermark inserted are protected against illegal copy, forgery and falsification. In addition, the key sharing and update function is provided without the need for additional components, thereby saving time and cost.

The method for sharing and updating a key according to the exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, Read-Only Memory (ROM), Random-Access Memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for sharing and updating a key, comprising:
receiving an image to be protected from an image input device;
encoding the image;
inserting a master key value as a watermark into the encoded image to produce a watermarked encoded image; and
transmitting the watermarked encoded image to a receiver,
wherein the master key value is used by the receiver to generate a new key value used in encryption or a watermark in a subsequent received image.

2. The method according to claim 1, further comprising
transmitting a master key information relating to the master key value to the receiver,
wherein the master key information is transmitted in a user-defined field separate from the watermarked encoded image.

3. The method according to claim 2, wherein the master key information includes a key update request flag and a master key hash value.

4. The method according to claim 3, further comprising
receiving, by the receiver, the master key information in a user-defined field and the watermarked encoded image;
decoding the watermarked encoded image; and
extracting the master key value inserted as a watermark from the decoded watermarked encoded image; and
extracting the received master key hash value from the master key information in the user-defined field.

5. The method according to claim 4, further comprising
calculating a hash value of the extracted master key value that was inserted as a watermark in the watermarked encoded image resulting in a calculated master key hash value;
comparing the calculated master key hash value with the received master key hash value extracted from the user-defined field; and
notifying a user that the image to be protected is forged or falsified when the calculated master key hash value is different from the received master key hash value.

6. The method according to claim 4, further comprising
checking the value of the key update request flag;
calculating a hash value of the extracted master key value that was inserted as a watermark in the watermarked encoded image resulting in a calculated master key hash value; and
comparing the calculated master key hash value with the received master key hash value extracted from the user-defined field,
wherein a new key value is generated using the received master key value using a key derivation function when the value of the key update request flag is "1" and the calculated master key hash value is equal to the received master key hash value, and
wherein a new key value is not generated when the value of the key update request flag is "0" or when the calculated master key has value is not equal to the received master key hash value.

7. The method according to claim 1, wherein the master key value is generated from a random number generator.

8. The method according to claim 1, wherein the master key value is generated using predetermined data including vital information or authentication information.

9. A method for sharing and updating a key, comprising:
receiving a watermarked encoded image, wherein the watermarked encoded image includes an encoded image to be protected and a master key value inserted as a watermark into the encoded image;
decoding the watermarked encoded image having a master key value inserted as a watermark; and
extracting the master key value from the decoded watermarked encoded image,
wherein the master key value is used to generate a new key value used in encryption or a watermark in a subsequent received image.

10. The method according to claim 9, further comprising
receiving a master key information relating to the master key value, wherein the master key information is received in a user-defined field separate from the watermarked encoded image.

11. The method according to claim 9, wherein the master key value is generated from a random number generator.

12. The method according to claim 9, wherein the master key value is generated using predetermined data including vital information or authentication information.

13. The method according to claim 10, wherein the master key information includes a key update request flag and a master key hash value.

14. The method according to claim 13, further comprising
checking the value of the key update request flag;
calculating a hash value of the extracted master key value that was inserted as a watermark in the watermarked encoded image resulting in a calculated master key hash value; and comparing the calculated master key hash value with the received master key hash value extracted from the user-defined field, wherein a new key value is generated using the received master key value using a key derivation function when the value of the key update request flag is "1" and the calculated master key hash value is equal to the received master key hash value, and wherein a new key value is not generated when the value of the key update request flag is "0" or when the calculated master key has value is not equal to the received master key hash value.

15. The method according to claim 13, further comprising calculating a hash value of the extracted master key value that was inserted as a watermark in the watermarked encoded image resulting in a calculated master key hash value;

comparing the calculated master key hash value with the received master key hash value extracted from the user-defined field; and notifying a user that the image to be protected is forged or falsified when the calculated master key hash value is different from the received master key hash value.

16. A method for sharing and updating a key, comprising:
receiving an image to be protected from an image input device;
receiving a master key value;
determining if the master key value needs to be updated; and
encoding the image to be protected;
wherein the master key value is inserted into the encoded image to produce a watermarked encoded image when the master key value does not need to be updated, and
wherein a new master key value is generated and inserted into the encoded image to produce a watermarked encoded image when the master key value needs to be updated.

17. The method according to claim 16, further comprising inserting a key update request flag and a new master key hash value into a user-defined field in a data transmission when the master key value needs to be updated.

18. The method according to claim 16, further comprising using the new master key value as an input to a key derivation function to generate a plurality of new key values when the master key value needs to be updated.

19. The method according to claim 18, wherein the new key values are used for image encryption or watermarking of subsequent frames.

20. The method according to claim 16, wherein the new master key value is generated using predetermined data including vital information or authentication information.

* * * * *